US005102946A

United States Patent [19]

Chen et al.

[11] Patent Number: 5,102,946

[45] Date of Patent: Apr. 7, 1992

[54] STABILIZED CHLORINATED RESIN LATEX

[75] Inventors: John C. Chen, Wilmington, Del.; Royce E. Ennis, Silbee, Tex.

[73] Assignee: E. I. Du Pont de Nemours and Company, Wilmington, Del.

[21] Appl. No.: 722,450

[22] Filed: Jun. 27, 1991

[51] Int. Cl.[5] ....................... C08L 27/24; C08L 23/34; C08L 23/32; C08L 23/28

[52] U.S. Cl. .................................... 524/527; 524/521; 524/522

[58] Field of Search ......................... 524/522, 521, 527

[56] References Cited

U.S. PATENT DOCUMENTS

| | | | |
|---|---|---|---|
| 3,632,671 | 1/1972 | Furukawa et al. | 260/876 |
| 4,202,808 | 5/1980 | Fan | 524/522 |
| 4,415,698 | 11/1983 | Fan | 524/521 |
| 4,469,844 | 9/1984 | Doak | 525/71 |

FOREIGN PATENT DOCUMENTS

| | | |
|---|---|---|
| 58-127752 | 7/1983 | Japan . |
| 59-004637 | 11/1984 | Japan . |
| 59-232136 | 12/1984 | Japan . |

*Primary Examiner*—Paul R. Michl
*Assistant Examiner*—Tae H. Yoon
*Attorney, Agent, or Firm*—Craig H. Evans

[57] ABSTRACT

A stabilized chlorinated resin latex comprising a mixture in water of A) 50–95 wt. %, based on the weight of A and B, of a chlorinated resin, substantially free of acid moieties, having a chlorine content of 15–70 wt. %, and B) 5–50 wt. %, based on the weight of A and B, of a salt of a water-insoluble $C_2$–$C_{12}$ alpha, beta- unsaturated olefin copolymer which contains at least 2 mole % acid moieties and is compatible with the chlorinated resin.

19 Claims, No Drawings

STABILIZED CHLORINATED RESIN LATEX

BACKGROUND OF THE INVENTION

This invention relates to aqueous chlorinated resin emulsion compositions that have enhanced stability and are useful in the preparation of adhesives and coating compositions.

Solvent-based adhesive and coating compositions which contain saturated chlorinated binder resins combine the properties of excellent moisture resistance, outdoor weatherability, chemical resistance, and substrate adhesion. Consequently they have enjoyed great commercial success for many years. The use of such compositions has however declined due to concerns regarding environmental impact and health hazards associated with compositions of high volatile organic content (VOC).

It has long been recognized that the outstanding properties of these particular adhesives and coating compositions are attributable to the saturated polymer backbone structure and chlorine content of the binder resin component. Therefore, attempts have been made to develop aqueous latex compositions based on saturated chlorinated binder resins, the objective being to maintain coating properties while minimizing VOC. Such attempts have met with limited success. The high surfactant level necessary to obtain stable latex emulsions adversely affects adhesion and, in addition, moisture barrier properties of coatings derived from the latices have also proved inadequate.

The present invention provides aqueous latex emulsions especially useful for the preparation of adhesives and marine and industrial coatings which do not require the use of large amounts of conventional surfactants, yet are stable for substantial periods of time and low in VOC.

SUMMARY OF THE INVENTION

More specifically this invention is directed to a stable aqueous latex emulsion, especially useful in adhesive applications, which stable aqueous latex emulsion comprises a mixture in water of A). 50 to 95 weight percent, based on the total weight of A and B, of a saturated chlorinated binder resin, substantially free of acid moieties, having a chlorine content of from 15-70 weight percent and a weight average molecular weight of from about 5,000 to about 250,000, and B). 5-50 weight percent, based on the total weight of A and B, of a salt of a water-insoluble $C_2$-$C_{12}$ alpha, beta-unsaturated olefin copolymer which contains at least 2 mole % acid moieties and which is compatible with the chlorinated resin.

For certain applications in which enhanced latex stability is critical, the latex composition may additionally contain small amounts, up to about 1 wt. %, based on the total weight of A and B, of an anionic and/or a nonionic surfactant.

The above-described latex compositions, when combined with fillers, pigments, plasticizers, antioxidants, curatives, and flame retardants, yield adhesives and coating compositions which are stable for long periods, despite the low level of surfactant present. Furthermore, VOC is reduced over prior art compositions. In addition, the adhesives and films derived from these compositions retain the moisture barrier and adhesion properties associated with saturated chlorinated resins.

The invention is also directed to a process for the preparation of a stable aqueous latex composition which comprises blending in a mixer A. 50 to 95 weight percent, based on the total weight of A and B of a saturated chlorinated binder resin, substantially free of acid moieties, having a weight average molecular weight from about 5,000 to about 250,000, B. 5-50 weight percent, based on the total 15 weight of A and B, of a water-insoluble $C_2$-$C_{12}$ alpha, beta-unsaturated olefin copolymer which contains at least 2 mole % acid moieties and which is compatible with the chlorinated resin, and C. sufficient aqueous organic or inorganic base to obtain an emulsion having a pH of at least about 8.

DETAILED DESCRIPTION OF THE INVENTION

The stable aqueous latex compositions of the invention contain a chlorinated resin component and a partially or completely neutralized acid polymer component. The chlorinated resin component is responsible for the physical properties of films prepared from the latex and the acid polymer is responsible for latex stabilization. As used herein the phrase stable latex means that the latex composition does not form a substantial amount of coagulum on standing within a period of two weeks. The acid polymer component promotes latex stabilization because it functions as a particularly effective surfactant for the chlorinated binder resin. In addition, the saturated polymer backbone structure provides UV stability and weatherability, while the presence of acid salt moieties promotes stable interaction with the hydrated environment external to the latex particle.

The saturated chlorine-containing binder resin component of the latex compositions is substantially free of acid moieties and contains 15-70 weight percent chlorine, preferably 20 to 60 weight percent, and has a number average molecular weight of about 5,000 to about 250,000. Chlorine levels within the range disclosed promote the formation and effectiveness of chain entanglement which contributes to film toughness and strength. In addition this level of chlorine in the binder resin improves resistance to attack by acids and bases. Therefore, if the chlorine level is below about 15% the chemical resistance of films derived from the compositions will be compromised. In addition, adhesives derived from the compositions would be soft and lack sufficient tensile strength to form strong films. Binder resins having low molecular weights, i.e. from 5,000-25,000, are particularly suited for traffic and marine paints. Those polymers having molecular weights in the range of 80,000-250,000 are more suited to adhesive applications.

The chlorinated resins suitable for use in the invention are chlorinated polyolefins including, among others, chlorinated homopolymers of $C_2$14 $C_8$ alpha,beta-unsaturated monoolefins; chlorinated polyisoprene; polyvinyl chloride; vinyl chloride copolymers with vinyl acetate, maleic anhydride, and alkyl esters of alpha,beta-unsaturated acids; chlorinated copolymers of ethylene and at least one ethylenically unsaturated monomer selected from the group consisting of $C_3$-$C_{20}$ alpha,beta-unsaturated olefins, alkyl esters of unsaturated $C_3$-$C_{20}$ mono- or dicarboxylic acids, and vinyl esters of saturated $C_2$-$C_{18}$ carboxylic acids; and chlorinated graft copolymers of ethylene or propylene with unsaturated anhydrides. Preferred chlorinated resins include chlorinated polyethylene, chlorosulfonated polyethylene, chlorinated ethylene vinyl acetate, chlorosulfonated ethylene vinyl acetate, chlorosulfonated ethylene/octene copolymers, vinyl chloride/vinyl acetate copolymers, chlorinated polypropylene/maleic anhydride graft copolymers, and chlorinated polyethylene/maleic anhydride graft copolymers. These polymers are well-known in the art and are available commercially. They are prepared by solution or suspension chlorination of olefin polymers or by copolymerization of chlorinated monomers. For example, the copolymerization of vinyl chloride and vinyl acetate can be carried out in a non-reactive organic solvent in the presence of a peroxide initiator. Chlorosulfonated polyolefins are prepared in a chlorinated solvent in the presence of a free radical initiator and chlorinated polyethylene is most commonly prepared using an aqueous suspension process. The chlorine resin component can be a single polymer or a blend of one or more chlorinated polymers having the required chlorine content.

The compositions of the invention also contain one or more salts of water-insoluble $C_2$–$C_{12}$ alpha,beta-unsaturated olefin copolymers which contain at least two mole % acid moieties and are compatible with the chlorinated binder resin. By compatible is meant that the olefin copolymer will form a thermodynamically stable mixture with the binder resin. Polymers suitable for use in the composition of the invention include copolymers of $C_2$–$C_{12}$ alpha,beta-unsaturated olefins with $C_3$–$C_{10}$ alpha,beta-ethylenically unsaturated acids; graft copolymers of $C_2$–$C_{12}$ alpha,beta-unsaturated olefins with maleic acid or fumaric acid; and partially hydrolyzed chlorosulfonated polymers of $C_2$–$C_8$ alpha monoolefins. Preferably the alpha,beta-unsaturated olefin is ethylene. Specific examples of the alpha,beta-unsaturated olefin copolymers include ethylene/acrylic acid copolymer, ethylene/methacrylic acid copolymer, ethylene/vinyl acetate/acrylic acid copolymer, chlorinated ethylene/vinyl acetate/acrylic acid copolymer, chlorinated ethylene/acrylic acid copolymer, chlorosulfonated ethylene vinyl acetate/acrylic acid copolymer, chlorosulfonated ethylene/acrylic acid copolymer, and chlorosulfonated polypropylene-g-maleic acid.

Generally the acid moiety is present as a result of copolymerization of the olefin monomer with an acid monomer but it may also be derived by chemical modification of a non-acid moiety on the polymer backbone, for example an anhydride, acid chloride, or sulfonyl chloride. Preferably the copolymer is chlorinated because this enhances the chemical resistance of the overall latex system. Chlorine contents of 10–40 wt. % are particularly preferred because they provide the greatest flexibility in balancing chemical resistance and latex stability properties. The acid content of the copolymers is at least about 2 mole %, preferably at least 6 mole %. Levels below this value are not generally sufficient to effect latex stabilization. Polymers with acid contents above about 20 mole % are not sufficiently lipophilic for use in the process of the invention.

The acid moieties are neutralized with aqueous solutions of organic or inorganic bases. Amines are the preferred neutralizing agents because a bulky base produces enhanced repulsion amongst the latex particles. In addition, ultimate moisture resistance of films derived from the latex will depend on the level of residual base, and organic bases evaporate readily. Typical bases which may be used to form the compositions of the invention include potassium hydroxide, sodium hydroxide, ammonia, diethanolamine, triethanolamine, triethylamine, ethanolamine, ethyl diethanolamine, and ethyl ethanolamine. Enough base should be added so that the pH of the resultant latex will be at least 8.

The acid-containing polymers are generally prepared by copolymerization of an olefin and an unsaturated carboxylic acid monomer by high pressure free-radical polymerization to produce a branched polymer. Such compositions are available commercially. Neutralization of acid-containing polymers is preferably effected during latex preparation.

The level of chlorinated binder resin and acid polymer in the latexes of the invention should generally be within the range of about 50–95 wt. % and 5–50 wt. %, respectively, based on the total weight of these two components. Preferably the level of chlorinated resin is 65–90 wt. % and the level of acid polymer is 10–35 wt. %. Too low a level of binder resin results in poor moisture resistance, outdoor weatherability, chemical resistance, and substrate adhesion of films made from the latex compositions of the invention, since it is the binder resin which contributes most to these properties.

The stable latexes of the invention are generally prepared by intimately mixing an organic solvent solution of the chlorinated binder resin, an organic solvent solution of the acid-containing polymer, and an aqueous base under high shear mixing conditions, for example in a homomixer, a high-shear blender, or a combination of centrifugal pumps.

The amount of aqueous base added is such that the solids content of the latex is from 5–75% and the pH of the resultant latex is at least about 8. This insures that the acid groups on the polymer are neutralized. Since it is not necessary to employ surfactants during the latex preparation, an emulsion is obtained which provides films having excellent adhesivity. The resultant emulsion may be further refined by removal of the organic solvents, and such removal is preferred for the preparation of low VOC coatings and adhesives.

In an alternative embodiment of the invention, up to 1 wt. % of a surfactant of the anionic or nonionic type may be added to the latex compositions of the invention without adversely affecting bond strength. The surfactants lower surface tension and reduce the tendency for the particles to stick to one another. Even with this amount of surfactant adhesion is substantially better than that exhibited by adhesives made from commercially available chlorinated resin latexes. These commercial latexes require large amounts of surfactants, generally about 6–10 wt. %, to provide long-term stability.

Conventional additives, such as fillers, thickeners, pigments, antioxidants, curatives, and flame retardants may also be added to the stable aqueous latexes depending on the particular end-use which is desired. The latexes are particularly suited for preparation of marine paints, traffic paints, and resorcinol formaldehyde adhesives.

The invention is further illustrated, but not limited to the following embodiments wherein all parts are parts by weight.

EXAMPLES

Example 1

A stabilized chlorosulfonated ethylene/octene copolymer latex was prepared as follows. A 182 g sample of chlorosulfonated ethylene/octene copolymer (chlorine content 33%, sulfur content 1%; prepared from an ethylene/octene copolymer containing 1% octene, melt index 14 g/10 min.) was dissolved in 1686 g methylene chloride. To this solution was added 99 g of a chlorosulfonated ethylene/vinyl acetate/acrylic acid terpolymer (chlorine content 17%, sulfur content 3.9%; prepared from an ethylene/vinyl acetate/acrylic acid terpolymer having a monomer ratio of 73/11/16 and a Brookfield viscosity of 650 centipoise at 140° C.). In a separate container an aqueous diethanolamine solution was prepared by dissolving 15 g of the amine in 1,893 g water. The two solutions were then mixed with an EPPENBACH ® homomixer for 5 minutes at a setting of 90 volts on the rheostat until a finely divided oil/water emulsion was formed. The emulsion was treated with steam under vacuum to remove the methylene chloride solvent and yielded 1,950 g of polymer latex having a solids content of 9.1%. To this latex was added 130 g of a 1% aqueous hydroxyethylcellulose solution. After 24 hours two layers had formed, a clear layer containing no polymer, and a milky layer containing the polymer latex. The clear layer was decanted leaving 335 g of latex having a solids content of 51.1%. The average particle size was determined by light scattering after seven days storage at 25° C. and was found to be 1150 nm.

Example 2

As an alternative embodiment of the invention a stabilized chlorosulfonated ethylene/octene copolymer latex was prepared substantially as described in Example 1, but in the presence of a surfactant system as follows. A 150 g sample of the chlorosulfonated ethylene/octene copolymer of Example 1 was dissolved in 1389 g methylene chloride. To this solution was added 80.8 g of the chlorosulfonated ethylene/vinyl acetate/acrylic acid terpolymer of Example 1. In a separate container an aqueous diethanolamine solution was prepared by dissolving 13 g of the amine, 1.73 g of an anionic surfactant (the ammonium salt of a sulfate ester of an alkylphenoxypoly(ethyleneoxy)ethanol, 59% active ingredient), and 0.48 g nonylphenolpoly(ethyleneoxy)ethanol, in 1,560 g water. The emulsion was treated with steam under vacuum to remove the methylene chloride solvent and yielded 2,355 g of polymer latex having a solids content of 8.7%. To this latex was added 130 g of a 1% aqueous hydroxyethylcellulose solution. After 24 hours a clear layer and a polymer latex layer had formed. The clear layer was decanted leaving 345 g of latex having a solids content of 47.9%. The average particle size was determined by light scattering after storage at 20° C. for one week and was found to be 379 nm.

Control Example 2A

A chlorosulfonated ethylene/octene copolymer latex was prepared substantially as described in Example 1, but in the presence of a surfactant system as follows. A 150 g sample of the chlorosulfonated ethylene/octene copolymer of Example 1 was dissolved in 1159 g methylene chloride. In a separate container an aqueous surfactant solution was prepared by dissolving 10.98 g of an anionic surfactant (the ammonium salt of a sulfate ester of an alkylphenoxypoly(ethyleneoxy)ethanol, 59% active ingredient), and 3.05 g nonylphenolpoly(ethyleneoxy)ethanol, in 1203 g water. After removal of the methylene chloride solvent 2050 g of polymer latex was recovered having a solids content of about 8%. To this latex was added about 80 g of a 1% solution of aqueous hydroxyethylcellulose solution. After 24 hours a clear layer separated and, after decantation, a latex containing about 350 g of polymer, 49% solids, was obtained.

Control Example 2B

Another chlorosulfonated ethylene/octene copolymer latex was prepared substantially as described in Example 2A except that 18 g of the anionic surfactant and 5.5 g of the nonionic nonylphenolpoly(ethyleneoxy)ethanol surfactant were used in place of the amounts used in Control Example 2A. After removal of the methylene chloride solvent 2018 g of polymer latex was recovered having a solids content of about 8.1%. To this latex was added about 98 g of a 1% solution of aqueous hydroxyethylcellulose solution. After 24 hours a clear layer separated and, after decantation, a latex containing about 327 g of polymer, 47% solids, was obtained.

Resorcinol formaldehyde adhesive latexes (RFL) were prepared from the latexes of Examples 1 and 2 and Control Examples 2A and 2B by mixing 2.02 parts of resorcinol, 2.75 parts of a 37% aqueous formaldehyde solution, 38 parts of the Example latex, adjusted to 40% solids with water, 0.26 parts of sodium hydroxide as a 1.67% aqueous solution, and 17 parts of water. Nylon 66 fabric was treated with the RFLs and heat activated. The resultant fabrics were then pressed between two slabs of chlorosulfonated polyethylene compounded with 35 parts N762 carbon black, 3 parts low molecular weight polyethylene, 1 part m-phenylene-bis-maleimide, 2 parts paraffin wax, 4 parts magnesium oxide, 3 parts pentaerythritol, 1 part sulfur, 1 part of tetramethylthiuram disulfide and 1 part of mercaptobenzothiazole disulfide per 100 parts of chlorosulfonated polyethylene. The rubber slabs were then cured for 30 minutes at 153° C. The force required to pull the rubber and fabric apart was then tested using ASTM D-2138. The results are shown in Table I.

TABLE I

| | Sample | | | |
|---|---|---|---|---|
| | 1 | 2 | 2A | 2B |
| Particle Size, nm | 1150 | 379 | 250 | 320 |
| Adhesion, pli | 35[1] | 39[1] | 12[2] | 0 |

[1]Complete rubber stock tear
[2]Slight stock tear

Example 3

A series of stabilized chlorosulfonated polyethylene latexes were prepared as follows. For each sample 15 parts of chlorosulfonated polyethylene (chlorine content 43%, sulfur content 1.3%, prepared from polyethylene of melt index 100 g/10 min.) and varying amounts of chlorosulfonated ethylene/acrylic acid copolymer (chlorine content 27.3%, sulfur content 2.58%; prepared from ethylene/acrylic acid copolymer containing 15.4% acrylic acid) were dissolved in 85 parts methylene chloride. The amounts of each component used to prepare the samples are shown in Table I. In a separate container an aqueous diethanolamine solution of pH 10 was prepared. The methylene chloride solutions were each then mixed with 150 parts of an aqueous solution of NATROSOL ® modified cellulose (2.5 g/l) and enough aqueous diethanolamine solution to maintain the pH at about 10, i.e. about four times the volume of the methylene chloride solution, in an EPPENBACH ® homomixer for a time sufficient to form finely divided oil/water emulsions, usually about five minutes. In addition a control sample was prepared in the same manner and with the same ingredients except that no chlorosulfonated ethylene/acrylic acid was present. Particle sizes of the control latex and latexes of the invention are shown in Table II.

TABLE II

| | 3A | 3B | 3C | 3D | Control Example |
|---|---|---|---|---|---|
| Chlorosulfonated Polyethylene | 15 | 15 | 15 | 15 | 15 |
| Chlorosulfonated Ethylene/ Acrylic Acid | 1.5 | 3.0 | 4.5 | 6.0 | 0 |
| Methylene Chloride | 85 | 85 | 85 | 85 | 85 |
| Particle Size, nm* | 5580 | 8100 | 2380 | 3670 | 38500 |

*average particle size, via diffusion coefficient

All latexes had a milky appearance, but the control showed some coagulation immediately after preparation.

Example 4

A series of stabilized chlorosulfonated polyethylene latexes of the invention were prepared as follows. Varying amounts of chlorosulfonated polyethylene (chlorine content 43%, sulfur content 1.3%, prepared from polyethylene of melt index 100 g/10 min.) and ethylene/acrylic acid copolymer (15.4% acrylic acid, Brookfield viscosity approximately 500 centipose at 140° C.) were dissolved in 85 parts methylene chloride. Amounts of each component used are shown in Table III, wherein all amounts are in parts by weight. In a separate container an aqueous diethanolamine solution of pH 10 was prepared. The methylene chloride solutions were each then mixed with 150 parts of an aqueous solution of NATROSOL ® modified cellulose (2.5 g/l) and enough aqueous diethanolamine to maintain the pH at about 10 in an EPPENBACH ® homomixer for a time sufficient to form finely divided oil/water emulsions. In addition a control sample was prepared in the same manner and with the same ingredients except that ethylene/acrylic acid copolymer was not present. Particle sizes of the control latexes and latexes of the invention are shown in Table III.

TABLE III

| | 4A | 4B | 4C | Control Example |
|---|---|---|---|---|
| Chlorosulfonated Polyethylene | 15 | 15 | 15 | 15 |
| Ethylene/Acrylic Acid Copolymer | 1.5 | 4.5 | 6.0 | 0 |
| Methylene Chloride | 85 | 85 | 85 | 85 |
| Particle Size, nm* | 826 | 547 | 478 | 1590 |

*average particle size, via diffusion coefficient

The control gelled after preparation, whereas any settlement in the samples of the invention was readily redispersible on stirring after storage for four weeks.

Example 5

A series of stabilized chlorinated ethylene vinyl acetate latexes of the invention were prepared. For each sample 25 parts of chlorinated ethylene vinyl acetate copolymer (chlorine content 55%, melt index 2500 g/10 min.), 5 parts of chlorowax, and varying amounts of chlorosulfonated ethylene/vinyl acetate/acrylic acid copolymer (50.7% chlorine, 1.5% sulfur; prepared from an ethylene/vinyl acetate/acrylic acid copolymer containing 6.8% vinyl acetate and 10.2% acrylic acid, Brookfield viscosity 430 centipoise at 140° C.) were dissolved in toluene. The amounts of each component used are shown in Table III, wherein all amounts are in parts by weight. In a separate container an aqueous ammonium hydroxide solution of pH 10 was prepared. The toluene solutions were then each mixed with four times by volume of the aqueous base in a TEKMAR ® homomixer for a time sufficient to form finely divided oil/water emulsions. In addition a control sample was prepared in the same manner and with the same ingredients except that chlorosulfonated ethylene/vinyl acetate/acrylic acid copolymer was not present. Particle sizes of the control latex and latexes of the invention are shown in Table IV.

TABLE IV

| | 5A | 5B | 5C | Control Example |
|---|---|---|---|---|
| Chlorinated Ethylene/ Vinyl Acetate | 25 | 25 | 25 | 25 |
| Chlorowax | 5 | 5 | 5 | 5 |
| Chlorosulfonated Ethylene/ Vinyl Acetate/Acrylic Acid | 1.5 | 4.5 | 7.5 | 0 |
| Toluene | 47.3 | 51.8 | 56.3 | 45 |
| Particle Size, microns* | 0.9 | 1.3 | 1.4 | 0.8 |

*average particle size, via diffusion coefficient

The control showed some coalescence after 1.5 months, whereas the samples of the invention were readily dispersible.

Example 6

A series of stabilized chlorinated ethylene vinyl acetate latexes of the invention were prepared as follows. For each sample 100 parts of chlorinated ethylene vinyl acetate copolymer (chlorine content 55%, prepared from an ethylene vinyl acetate base resin having a vinyl acetate content of 14 and a melt index of 2500 g/10 min.), 40 parts chlorowax, and 25 parts SOLVESSO 100 ® solvent (a mixture of high boiling aromatic solvents) were dissolved in 302 parts of methylene chloride to form binder resin solutions. In addition a second set of methylene chloride solutions were prepared by dissolving 30 parts of chlorosulfonated ethylene/acrylic acid copolymer (27.3% chlorine, 2.58% sulfur; prepared from an ethylene/acrylic acid copolymer containing 15.4% acrylic acid, melt index 2500 g/10 min.) in 70 parts methylene chloride. Varying amounts of the two solutions were mixed with 100 parts of an aqueous solution of NATROSOL ® modified cellulose (2.5 g/l) and enough pH 10 aqueous diethanolamine to maintain the pH at about 10 in an EPPENBACH ® homomixer for a time sufficient to form finely divided oil/water emulsions. The amounts of each of the methylene chloride solutions used are shown in Table V, wherein all parts are parts by weight. In addition a control sample was prepared in the same manner and with the same ingredients except that chlorosulfonated ethylene/acrylic acid copolymer was not present. Particle sizes of the control latex and latexes of the invention are shown in Table V.

TABLE V

| | 6A | 6B | 6C | Control Example |
|---|---|---|---|---|
| Binder Resin Solution | 95 | 90 | 80 | 100 |
| Chlorosulfonated Ethylene/ Acrylic Acid Solution | 5 | 10 | 20 | 0 |
| Particle Size, nm* | 3050 | 3540 | 1900 | 8720 |

*average particle size, via diffusion coefficient

Example 7

A further series of stabilized chlorinated ehtylene vinyl acetate latexes of the invention were prepared in the following manner. A methylene chloride binder resin solution was prepared as described in Example 6 using the same amounts of each component. In addition a methylene chloride solution of an ethylene/acrylic acid copolymer (15.4% acrylic acid, Brookfield viscosity approximately 500 centipoise at 140° C.) was prepared by dissolving 30 parts of the copolymer in 70 parts methylene chloride. Varying amounts of the two solutions were mixed with 100 parts of an aqueous solution of NATROSOL ® modified cellulose (2.5 g/l) and enough pH 10 aqueous diethanolamine to maintain the pH of the mixture at about 10 in an EPPENBACH ® homomixer for a time sufficient to form finely divided oil/water emulsions. The quantities of each of the methylene chloride solutions used are shown in Table VI, wherein all parts are parts by weight. In addition a control sample was prepared in the same manner and with the same ingredients except that ethylene/acrylic acid copolymer was not present. Particle sizes of the control latex and latexes of the invention are shown in Table VI.

TABLE VI

| | 7A | 7B | 7C | Control Example |
|---|---|---|---|---|
| Binder Resin Solution | 95 | 80 | 60 | 100 |
| Ethylene/Acrylic Acid Copolymer Solution | 5 | 20 | 40 | 0 |
| Particle Size, nm* | 692 | 559 | 443 | 6300 |

*average particle size, via diffusion coefficient

Example 8

Four stabilized latexes were prepared in the following manner. Varying amounts of Ucar ® VYHD solution vinyl resin (a vinyl chloride/vinyl acetate copolymer, wt. ratio 86:14) and chlorosulfonated ethylene/acrylic acid copolymer (chlorine content 27.3%, sulfur content 2.58%; prepared from ethylene/acrylic acid copolymer containing 15.4% acrylic acid) were dissolved in 85 parts methylene chloride. The amounts of each polymer component used are given in parts by weight in Table VII. In a separate container an aqueous diethanolamine solution of pH 10 was prepared. The methylene chloride solutions were then each mixed with 150 parts of an aqueous solution of NATROSOL ® modified cellulose (2.5 g/l) and enough aqueous to maintain the pH at about 10 in an EPPENBACH ® homomixer for a time sufficient to form finely divided oil/water emulsions, usually about five minutes. In addition a control sample was prepared in the same manner and with the same ingredients except that no chlorosulfonated ethylene/acrylic acid was present. Particle sizes of the control latex and latexes of the invention are shown in Table VII.

TABLE VII

| | 8A | 8B | 8C | 8D | Control Example |
|---|---|---|---|---|---|
| Binder Resin | 13.5 | 12 | 10.5 | 9 | 15 |
| Chlorosulfonated Ethylene/ Acrylic Acid | 1.5 | 3.0 | 4.5 | 6.0 | 0 |
| Methylene Chloride | 85 | 85 | 85 | 85 | 85 |
| Particle Size, nm* | 3490 | 4700 | 3030 | 1610 | 2720 |

*average particle size, via diffusion coefficient

The control showed some sedimentation immediately after preparation.

Example 9

A further set of four stabilized Ucar ® VYHD solution vinyl chloride latexes were prepared using ethylene/acrylic acid in place of chlorosulfonated ethylene/acrylic acid. Varying amounts of the vinyl chloride/vinyl acetate copolymer binder resin of Example 8 and ethylene/acrylic acid copolymer (acrylic acid content, 15.4%) were dissolved in methylene chloride. The quantities of each component used for each sample are given in parts by weight in Table VII. The methylene chloride solutions were then each mixed with 150 parts of the aqueous solution of Natrosol ® modified cellulose of Example 8 and enough pH 10 aqueous diethanolamine to maintain the pH at about 10 in an EPPENBACH ® homomixer for a time sufficient to form finely divided oil/water emulsions, usually about five minutes. In addition a control sample was prepared in the same manner and with the same ingredients except that no ethylene/acrylic acid was present. Particle sizes of the control latex and latexes of the invention are shown in Table VIII.

TABLE VIII

| | 9A | 9B | 9C | 9D | Control Example |
|---|---|---|---|---|---|
| Binder Resin | 13.5 | 12 | 10.5 | 9 | 15 |
| Ethylene/ Acrylic Acid | 1.5 | 3.0 | 4.5 | 6.0 | 0 |
| Methylene Chloride | 85 | 85 | 85 | 85 | 85 |
| Particle Size, nm* | 1110 | 581 | 579 | 439 | 2120 |

*average particle size, via diffusion coefficient

The control displayed a large amount of gellation which was not redispersible after four weeks. Any precipitate in the samples of the invention readily redispersible and the samples remained pourable.

We claim:

1. A stable aqueous latex emulsion which comprises a mixture in water of

A) 50 to 95 weight percent, based on the total weight of A and B, of a saturated chlorinated binder resin, substantially free of acid moieties, having a chlorine content of from 15–70 weight percent and weight average molecular weight of from about 5,000 to about 250,000, and B) 5–50 weight percent, based on the total weight of A and B, of a salt of a water-insoluble $C_2$–$C_{12}$ alpha, beta-unsaturated olefin copolymer which contains at least 2 mole % acid moieties and which is compatible with the chlorinated resin.

2. The composition of claim 1 additionally comprising up to about 1 weight percent of an anionic or nonionic surfactant.

3. The composition of claim 1 wherein the binder resin has a chlorine content of from 20–60 weight percent.

4. The composition of claim 1 wherein the binder resin is chlorinated polyethylene.

5. The composition of claim 1 wherein the binder resin is chlorosulfonated polyethylene.

6. The composition of claim 1 wherein the binder resin is chlorinated ethylene vinyl acetate.

7. The composition of claim 1 wherein the binder resin is chlorosulfonated ethylene vinyl acetate.

8. The composition of claim 1 wherein the binder resin is a chlorosulfonated copolymer of ethylene and a $C_3$–$C_{20}$ alpha,beta-unsaturated monoolefin.

9. The composition of claim 1 wherein the binder resin is a chlorosulfonated ethylene/octene copolymer.

10. The composition of claim 1 wherein the binder resin is a copolymer of vinyl chloride and vinyl acetate.

11. The composition of claim 1 wherein the water-insoluble olefin copolymer is a copolymer of ethylene and a $C_2$–$C_{12}$ alpha,beta-unsaturated acid.

12. The composition of claim 1 wherein the water-insoluble olefin copolymer is a copolymer of ethylene and acrylic acid.

13. The composition of claim 1 wherein the water-insoluble olefin copolymer is a copolymer of ethylene and methacrylic acid.

14. A process for the preparation of a stable aqueous latex composition which comprises blending in a mixer A) 50 to 95 weight percent, based on the total weight of A and B of a saturated chlorinated binder resin, substantially free of acid moieties, having a weight average molecular weight from about 5,000 to about 250,000, B) 5–50 weight percent, based on the total weight of A and B, of a water-insoluble $C_2$–$C_{12}$ alpha,beta-unsaturated olefin copolymer which contains at least 2 mole % acid moieties and which is compatible with the chlorinated resin, and C) sufficient aqueous organic or inorganic base to obtain an emulsion having a pH of at least about 8.

15. The process of claim 14 further comprising the addition of up to about 1 weight percent of an anionic or nonionic surfactant.

16. The process of claim 14 wherein the chlorinated binder resin is chlorosulfonated polyethylene.

17. The process of claim 14 wherein the chlorinated binder resin is chlorosulfonated ethylene/vinyl acetate copolymer.

18. The process of claim 14 wherein the base is an organic amine.

19. The process of claim 18 wherein the organic base is diethanolamine.

* * * * *